(12) United States Patent
Frey et al.

(10) Patent No.: US 8,719,580 B2
(45) Date of Patent: May 6, 2014

(54) DATA VERIFICATION METHOD

(75) Inventors: Alexandre Frey, Meudon (FR); Gilles Peskine, Meudon (FR)

(73) Assignee: Trusted Logic, Meudon (FR)

( * ) Notice: Subject to any disclaimer, the term of this patent is extended or adjusted under 35 U.S.C. 154(b) by 106 days.

(21) Appl. No.: 13/380,847

(22) PCT Filed: Jun. 22, 2010

(86) PCT No.: PCT/EP2010/003744
§ 371 (c)(1),
(2), (4) Date: Dec. 25, 2011

(87) PCT Pub. No.: WO2010/149333
PCT Pub. Date: Dec. 29, 2010

(65) Prior Publication Data
US 2012/0110336 A1     May 3, 2012

(30) Foreign Application Priority Data
Jun. 26, 2009    (FR) ...................................... 09 03135

(51) Int. Cl.
*H04L 9/32*      (2006.01)
(52) U.S. Cl.
USPC ........................................................ 713/181
(58) Field of Classification Search
USPC ........................................................ 713/181
See application file for complete search history.

(56) References Cited

U.S. PATENT DOCUMENTS

2008/0172562 A1     7/2008   Cachin et al.

OTHER PUBLICATIONS

PCT/EP2010/003744 International Search Report, Aug. 30, 2010, European Patent Office, P.B. 5818 Patentlaan 2 NL-2280 HV Rijswijk.
PCT/EP2010/003744 Written Opinion of the International Searching Authority, Aug. 30, 2010, European Patent Office, P.B. 5818 Patentlaan 2 NL-2280 HV Rijswijk.

*Primary Examiner* — Jacob Lipman
(74) *Attorney, Agent, or Firm* — The Jansson Firm; Pehr B. Jansson

(57) ABSTRACT

(EN)An electronic system (1) comprises a trusted processor (2), a trusted cache memory (3) and a mass storage memory (4). The data are stored in the mass storage memory (4), where the memories are divided into blocks, each block is identified by an address and the data are addressed via a verification tree. The verification tree is a tree structure comprising nodes where descendent nodes are attached to a root node and each node stores the address of the block containing each of its child nodes and a digest value of each block. A method for the verification of the data of such an electronic system comprises access to searched data at the same time reporting the corruption of data if a calculated digest is different from the current digest value.

13 Claims, 7 Drawing Sheets

DATA VERIFICATION METHOD

TECHNICAL AREA OF THE INVENTION

This invention relates to the area of the verification of data stored in a mass storage medium. One particular application of the invention is aimed at protecting electronic systems, such as computer systems.

STATE OF THE PRIOR ART

The document U.S. Pat. No. 4,309,569 describes a digital signature method for the purposes of authentication of a message, which uses an authentication tree function of a one-way function of a secret number.

The document U.S. Pat. No. 4,881,264 describes a method of generating digital signatures for signing an infinitely expandable series of messages Mi. An authentication tree formed of infinitely expandable signature nodes is used. Each node may be used for signing a message. Each node is also used to sign up to k sub-nodes, where k is an integer greater than 1. Each signature used, both for signing messages and for signing sub-nodes, is a unique signature based on a one-way function F. The function F is public. To sign a message Mi the signer selects a previously unused node (node i) from the tree. The message signing key at that node is then used to sign the message. The sequence of nodes from the root of the tree (node 1) up to node i is then used to verify that the message signature is correct and has not been tampered with. That procedure proves that the message has not been tampered with.

Authentication trees like those described in the aforementioned documents may be used to verify and particularly to detect the corrupting of data stored in a mass storage memory. However, access to the stored data is not efficient or requires the use of memory space, e.g. cache memory, that is large enough for storing all the signatures.

DESCRIPTION OF THE INVENTION

In view of the above, one of the problems addressed by the invention is the need for a method for verifying the data of an electronic system comprising a trusted processor, a trusted cache memory and a mass storage memory, where the data are stored in the mass storage memory, and the said method does away with the drawbacks of the earlier art by accessing the data efficiently.

The solution proposed by the invention for this problem is a method for verifying the data stored in a storage memory and addressed through a verification tree using a secure or trusted cache memory in which the verification tree is stored.

More precisely, in a first aspect, the invention relates to a method of verifying the data of an electronic system comprising a trusted processor, a trusted cache memory and a mass storage memory, where the data are stored in the mass storage memory and the memories are divided into blocks, where each block is identified by an address and data are addressed via a verification tree, where the verification tree is a tree structure comprising nodes, where descending nodes are attached to a root node and where each node stores the address of the block containing each of its child nodes and a value of the digest of each block.

The method involves accessing search data through the following steps:

a) initialising a current node at the root node by initialising the current digest value at the value of a reference digest of the block containing the root node, b) loading the block containing the current node in the trusted cache memory, c) calculating the digest of the loaded block, d) reporting the corruption of data if the calculated digest is different from the current digest value and stopping access to the data searched, e) sending back the current node if the current node contains the searched data and stopping the step for access to the searched data, f) determining the child node from which a sub-tree containing the data is derived, g) assigning the value of the digest of the child node stored in the current node at the current digest, the child node then becoming the current node, h) looping to the loading step b).

After the current node initialisation step a), the method may comprise an additional step consisting in verifying if a block located in the trusted memory contains the current node, the loading steps b), the digest calculation step c), the digest verification and data corruption reporting step d) being implemented when the said block does not contain the current node.

The initialisation step may consist in initialising the current node at node N by initialising the current digest value to the value of a digest calculated from a block present in the trusted cache memory and containing an ancestor node N of the node containing the searched data.

The initialisation step may consist in initialising the current node at node N by initialising the current digest value current digest value at the value of a digest founding the trusted cache memory when the digest value of the block is present in the trusted cache memory.

Advantageously, when the block or block digest of the current node are stored in the trusted cache memory, the block or the digest of the block of the parent node at the current node are also stored in the trusted cache memory.

The method may involve the modification of a block in the following steps:

a) accessing the block located in the mass storage memory and transferring it to the trusted memory, b) modifying the content of the block, c) calculating the digest value of the modified content of the block, d) writing the content of the block in the mass storage memory, e) if the block contains the root node, storing the calculated digest value in the trusted memory as a new value of the reference digest of the block, and f) if the block does not contain the root node, in a parent block containing the parent node of the block, replacing the digest value of the parent block with the calculated digest value.

In one alternative, the method may include a modification of a block in the following steps:

a) reading the content of the block located in the mass storage memory and transferring it to the trusted memory without verifying its integrity, b) calculating the digest value of the content of the block read, c) modifying the content of the block, d) calculating the digest value of the modified block content, e) writing the modified block content in the mass storage memory, without overwriting the previous block content, f) if the block does not contain the root node, in a parent block containing the parent node of the block, replacing the digest value of the parent block with the calculated digest value, g) if the block contains the root node, verifying that the initial digest of the block is equal to the reference digest of the root block and that the initial digest of each other block crossed is equal to the digest found in the parent node of the said block, then storing the calculated digest value of the root block in the trusted memory as the new value of the reference digest of the block.

The digest may be a check sum for protection from accidental corruption or a cryptographic digest that is authenticated or otherwise for protection from tampering. Besides, the mass storage memory may be a cache memory vis-a-vis another mass storage memory.

The method may comprise a step of decryption of the data transferred from the mass storage memory to the trusted cache memory and a step of encryption of the data transferred from the trusted cache memory to the mass storage memory.

The method may comprise a step of clearing the trusted cache memory consisting in dynamically determining the time and the order of writing the content of the modified block in the mass storage memory and updating the digest in the parent node before they are erased from the trusted cache memory.

In a second aspect, the invention relates to a computer program comprising program code instructions that make a programmable processor execute the steps of the data verification method in the invention, when the said program is executed by the programmable processor.

In a third aspect, the invention relates to an electronic system comprising a trusted processor, a trusted cache memory and a mass storage memory, where the trusted processor and the trusted cache memory are located in a trusted core, and the mass storage memory is located in an unsecure environment and the processor implements the data verification method according to the invention.

Thus, the invention makes it possible to effectively access the stored data addressed via the verification tree that are stored in a trusted or secure cache memory, while using a small cache memory, particularly one that may be insufficient for containing the whole structure of the verification tree. The invention makes it possible to manage such a trusted cache memory effectively while at the same time maintaining the performance of the system at an acceptable level. The invention also makes it possible to detect any corruption of the data stored in the mass storage memory and trigger particular action if the data read back by the trusted processor are not those that were stored previously. Other benefits of the invention will become clear in the description enclosed.

DESCRIPTION OF FIGURES

The invention will be better understood upon reading the non-limitative description below, which refers to the drawings attached, where.

DETAILED DESCRIPTION OF THE INVENTION

Figure 1:
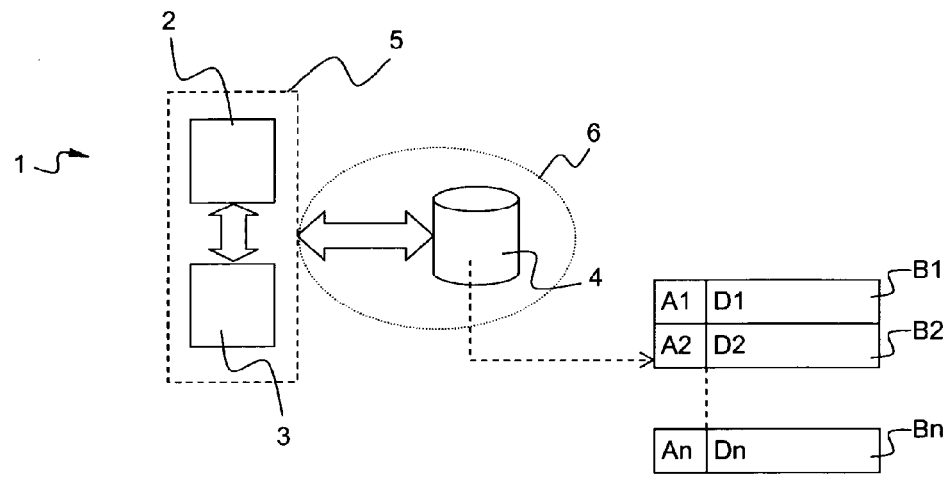
FIG. 1 schematically illustrates an electronic system.

FIG. 1 represents an electronic system 1 comprising a trusted processor 2, a trusted cache memory 3 and a mass storage memory 4.

The trusted processor 2 and the trusted cache memory 3 are part of a trusted core 5. The processor and the cache memory located in the trusted core are considered to be sufficiently reliable or sufficiently protected for the application considered. The trusted core may for example be a device that is physically protected from break-ins, such as for example a smart card or a TPM module (Trusted Platform Module), or a computer located in a place with controlled access.

The mass storage memory 4 is located in an unsecure environment 6 outside the trusted core. The mass storage memory 4 is divided into blocks B1, B2, Bn. Each block is identified by an address A1, A2, An. The elementary action carried out by the trusted processor 2 on the mass storage memory 4 is the reading of data D1, D2, Dn contained in a given address block and the writing of data in a given address block.

The trusted cache memory 3 is used to accelerate access by the trusted processor 2 to the mass storage memory 4. The trusted cache memory has a low storage capacity in comparison with the mass storage memory but is much faster to access. The size of the trusted cache memory 3 is, for example a few blocks. While reading, if the piece of data searched is present in the cache memory, time-consuming access to the mass storage memory is avoided. Also, the trusted cache memory is not exposed to the risk of data corruption, unlike the mass storage memory, as a result of which the reading of data from the trusted cache memory does not require any verification of integrity, unlike reading from the mass storage memory. While writing, several data stored temporarily in the cache memory may be written in one cache cleaning operation, thus avoiding a number of time-consuming accesses to the mass storage memory.

The mass storage memory 4 is liable to disturbances that lead to data corruption, either because of malfunctioning or because of deliberate attacks by outside parties. Data corruption leads to the replacement of original data by random data or data selected by an outside party. For example, the mass storage memory 4 may be a peripheral of the computer system including the trusted core such as a hard drive or a RAM or EEPROM type memory or a remote storage space controlled by another party and accessed by the trusted core through a communication network.

The data may be encrypted. In that case, the blocks are encrypted before they are written in the mass storage memory and decrypted after loading. The secret key is stored only in the trusted core.

Verification Tree

Figure 2:
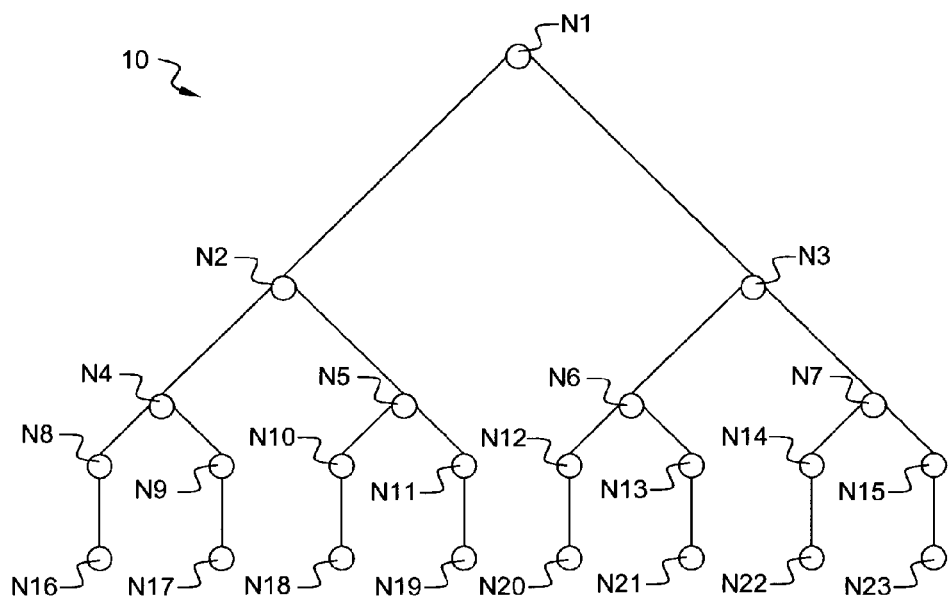
FIG. 2 schematically illustrates a verification tree organising the data.

In order to control the integrity of data D1, D2, Dn stored in the mass storage memory 4, the method in the invention organises the data according to a tree structure, for example a verification tree 10 such as that shown in FIG. 2. The verification tree or authentication tree or Merkle tree is a data structure that allows the verification of the integrity of part of a piece of data without requiring an examination of the entire piece of data. The principle of the verification tree consists in dividing up each piece of data into blocks, and calculating the digest of each block. A digest of a piece of data is a value that characterises the data with a low risk of error in view of the level of integrity required. It may be a check sum calculated from the data itself, for example parity or a CRC cyclic redundancy code. The digest may be of the cryptographic type, i.e. it is the image of the data using an encryption hash function such as MD5 (Message Digest 5) or SHA-1 (Secure Hash Algorithm 1). The digest may also be an authenticated digest, that is to say a cryptographic digest that takes account of a secret element, in addition to the data of which it is a check sum. For example, the authenticated digest may be of the HMAC type (keyed-hash message authentication code). That authenticated digest is calculated using a cryptographic hashing function in combination with a secret key. After calculating the digests of each block, the digests are considered to be new data, and the tree generation process is iterated till only one digest is obtained for the last data considered. The successive digests thus form a verification tree.

In FIG. 2, each node N1, N2, N3, ... N23 of the verification tree 10 is stored in a block and is designated by the address of the block containing it. A block may contain several nodes, in which case the designation of a node comprises an additional indication that makes it possible to identify the node out of those contained in the block. The address of the root node is kept in the trusted memory 3. The address of the child nodes (e.g. N4 and N5) of a node (N2 for the example with N4 and N5) is stored in this node.

It is also possible to verify the integrity of a block by verifying that the value of a root digest calculated from the data in the block is identical to the value of a reference root digest.

The verification tree provides benefits depending on the type of digest used, for example protection from accidental corruption, protection from tampering and authentication. The verification tree makes it possible to verify the integrity of a block by processing a volume of data that is proportional with the depth of the tree. If a block is modified, the verification tree can also be updated by processing a volume of data proportional with the depth of the tree.

The trusted processor 2 implements the data verification method that will be described below, for example by executing the instructions of a computer program. The method provides access to searched data, which are stored in the mass storage memory 4. It also makes it possible to modify the data and store them in the mass storage memory 4.

As illustrated in FIG. 2, the verification tree is a tree structure with nodes, where child nodes are attached to a root node. In each node N, for each child node Nf, the address of the block containing the child node and the digest of that block are stored. A reference value Eref of the digest of the block containing the root node Nr is kept continuously in the trusted memory 3. The digest may be a check sum for protection from accidental corruption or a cryptographic digest for protection from tampering.

Each time a block is loaded in the trusted memory, its digest must be checked against a digest known to be valid. If the same block is loaded several times successively, its digest must be verified every time it is loaded.

Figure 3:
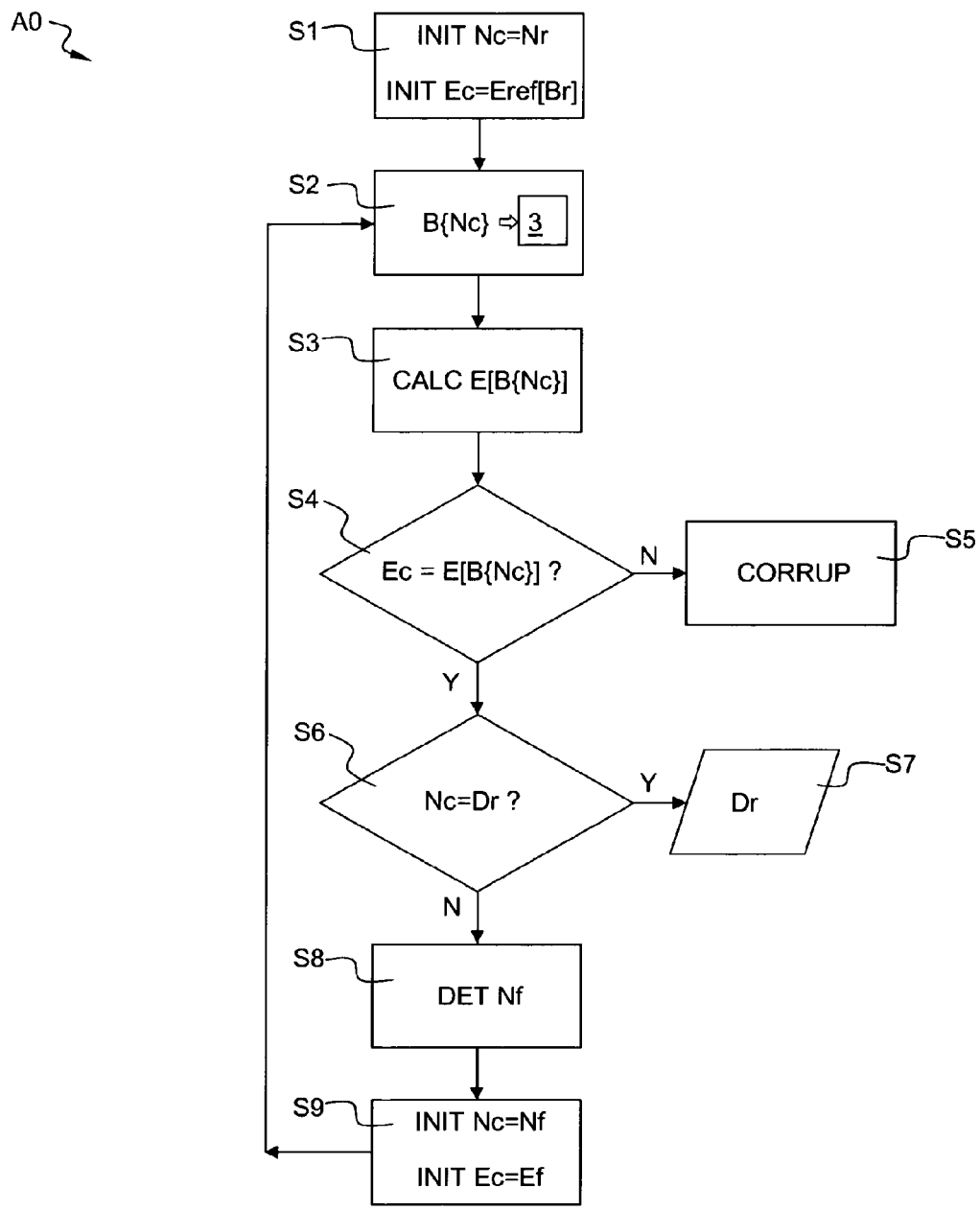
FIG. 3 schematically illustrates access to searched data in the mass storage memory.

FIG. 3 schematically illustrates a mode of embodiment for access to or reading A0 searched data Dr in the mass storage memory 4. A first step S1 consists in initialising an NC current node at the root node Nr by initialising the current digest value Ec at the value of a reference digest Eref of the block containing the root node Br. A second step S2 consists in loading the block containing the current node B{Nc} in the trusted cache memory 3. A third step S3 consists in calculating a digest of the loaded block E[B{Nc}]. A fourth step S4 consists in verifying if the calculated digest E[B{Nc}] is different from the current digest value Ec. A fifth step S5 consists in reporting data corruption and stopping access to the searched data when the values are different. A sixth step S6 consists in verifying if the current node Nc contains the searched data Dr. A seventh step S7 consists in sending back the current node and stopping access to the searched data when the current node Nc contains the searched data Dr. An eighth step S8 consists in determining the child node Nf from which a sub-tree containing the data is derived, when the current node Nc does not contain the searched data Dr. A ninth step S9 consists in assigning the value of the digest of the child node Ef stored in the current node to the current digest Ec, the child node Nf becoming the current node Nc. Then, the access method is looped to the second loading step S2.

The access method that has been described thus combines a data tree structure with a verification tree structure. With this access method, if the block containing the node containing the searched data is corrupted, when a piece of corrupted data is reached, such corruption is detected and reported. Such reporting may for instance be reflected by the abandonment of the action that had triggered access to the node and possibly the sending of a warning message to the user of the computer system or the owner of the protected data. In other cases, when the searched data are found, they may be considered to be sound and processed by the processor. Also, with this method, it is possible to process data that are in sound blocks even when other blocks are corrupted.

If the previously searched piece of data Dr is modified by the processor, the digests of all the modes on its access path must be recalculated. As a result, the blocks containing the said digests must be updated in the mass storage memory. Also, when a piece of data is added or deleted, one or more blocks are modified, which makes it necessary to update the blocks containing the ancestor nodes of the affected nodes.

The updating of a block involves loading that block in the trusted memory 3, modifying the content in the trusted memory 3 and then writing the modified content in the mass storage memory 4.

Figure 4:
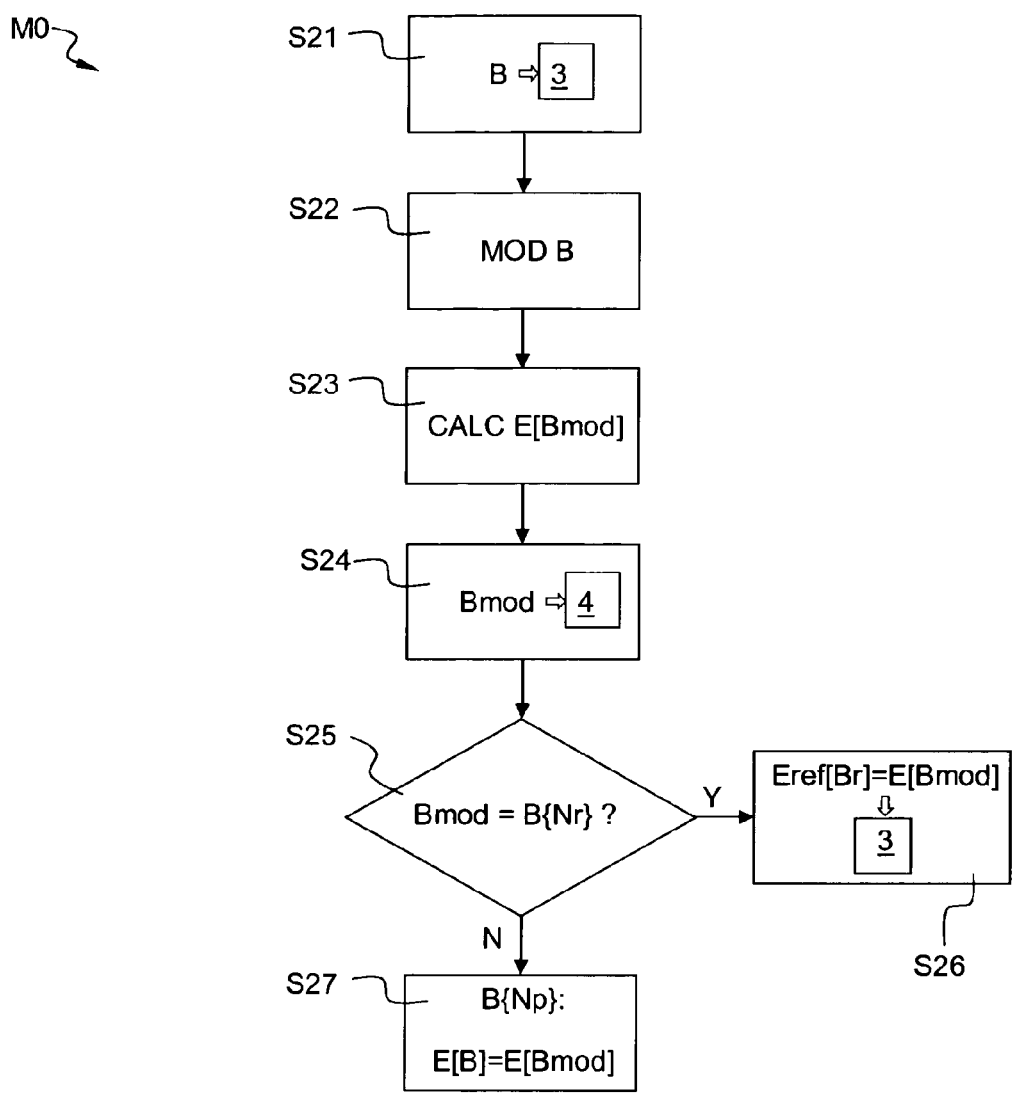
FIG. 4 schematically illustrates the modification of a block in the mass storage memory.

FIG. 4 is a schematic illustration of the modification M0 of a block in the mass storage memory 4. A first step S21 consists in accessing block B to modify that is located in the mass storage memory 4 and transferring the content of the said block B to the trusted memory 3. A second step S22 consists in modifying the content of the copy in the memory of block B. A third step S23 consists in calculating the value of the digest E[Bmod] of the modified content of the block. A fourth step S24 consists in writing the content of the block Bmod in the mass storage memory 4. A fifth step S25 consists in verifying if the block Bmod contains the root node Nr. A sixth step S26 consists in storing the digest value calculated in the trusted memory 3 as the new reference digest value of the block Eref[Br]=E[Bmod], when the block contains the root node. A seventh stage S27 consists in replacing in a parent block containing the parent node of the block B{Np} the digest value of the parent block with the calculated digest value E[B]=E[Bmod], when the block does not contain the root node. The modification method is recursive because the seventh step S27 asks for the modification of the parent block, which can particularly be done using the said modification method.

Reading Cache Memory

Access to a node requires loading the block from the mass storage memory to the trusted cache memory and calculating the block digest. These two operations are time-consuming for each block crossed. That is because firstly, usual mass storage memories are significantly slower than usual processors and secondly, the calculation time of a cryptographic digest can be fairly long. As regards the number of blocks crossed, it is proportional with the depth at which the data is located in the tree.

Further, storing the content of intermediate blocks that are used to access a piece of data in the trusted cache memory is not possible or is not desirable because it would require a large cache memory.

Figure 5:
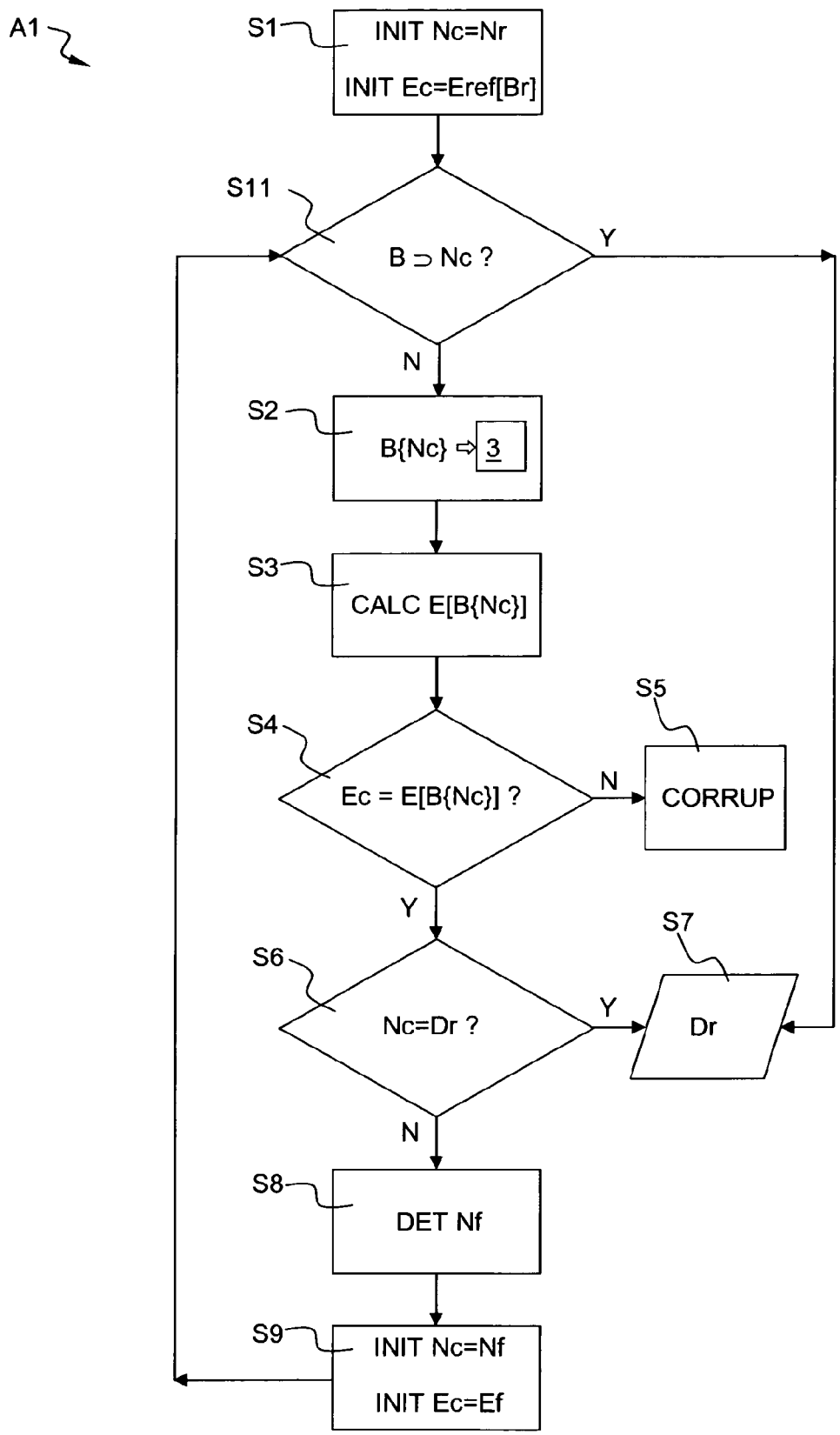
FIG. 5 schematically illustrates access to searched data in the mass storage memory in an alternative mode of embodiment.

FIG. 5 schematically illustrates another mode of embodiment for access A1 to searched data Dr in the mass storage memory 4 when the size of the available trusted memory is insufficient for storing all the intermediate blocks that are used to access a piece of data. That alternative makes it possible to effectively manage the trusted cache memory. The method of access is more or less identical to that described by reference to FIG. 3. It differs from it in the addition of an additional step S11 after the first step of initialisation of the current node S1. The additional step S11 consists in verifying if the block B located in the trusted memory 3 contains the current node Nc. The seventh step S7 consisting in sending back the current node and stopping access to the searched piece of data is directly executed, when the block B contains the current node Nc. Otherwise, that is to say when the said block does not contain the current node, the steps of loading S2, digest calculation S3, digest verification S4, reporting data corruption S5 and block verification S6 are implemented.

In another alternative (not illustrated), the first initialisation step S1 may consist in initialising the current node Nc at the node N by initialising the current digest value Ec at the value of a digest calculated from a block present in the trusted cache memory containing a node N ancestor of the node containing the searched piece of data.

In yet another alternative (not illustrated), the first initialisation step S1 may consist in initialising the current node Nc at a node N fulfilling the condition above by initialising the current digest value Ec at the value of a digest found in the trusted cache memory when the value of the digest of the block is present in the trusted cache memory.

As the calculation of a digest consumes a lot of processor utilisation time, it is advantageous to retain in the trusted cache memory the content of the block B and the corresponding digest. That makes it possible to read the digest of the block B from the trusted cache memory and not recalculate it.

Figure 6:
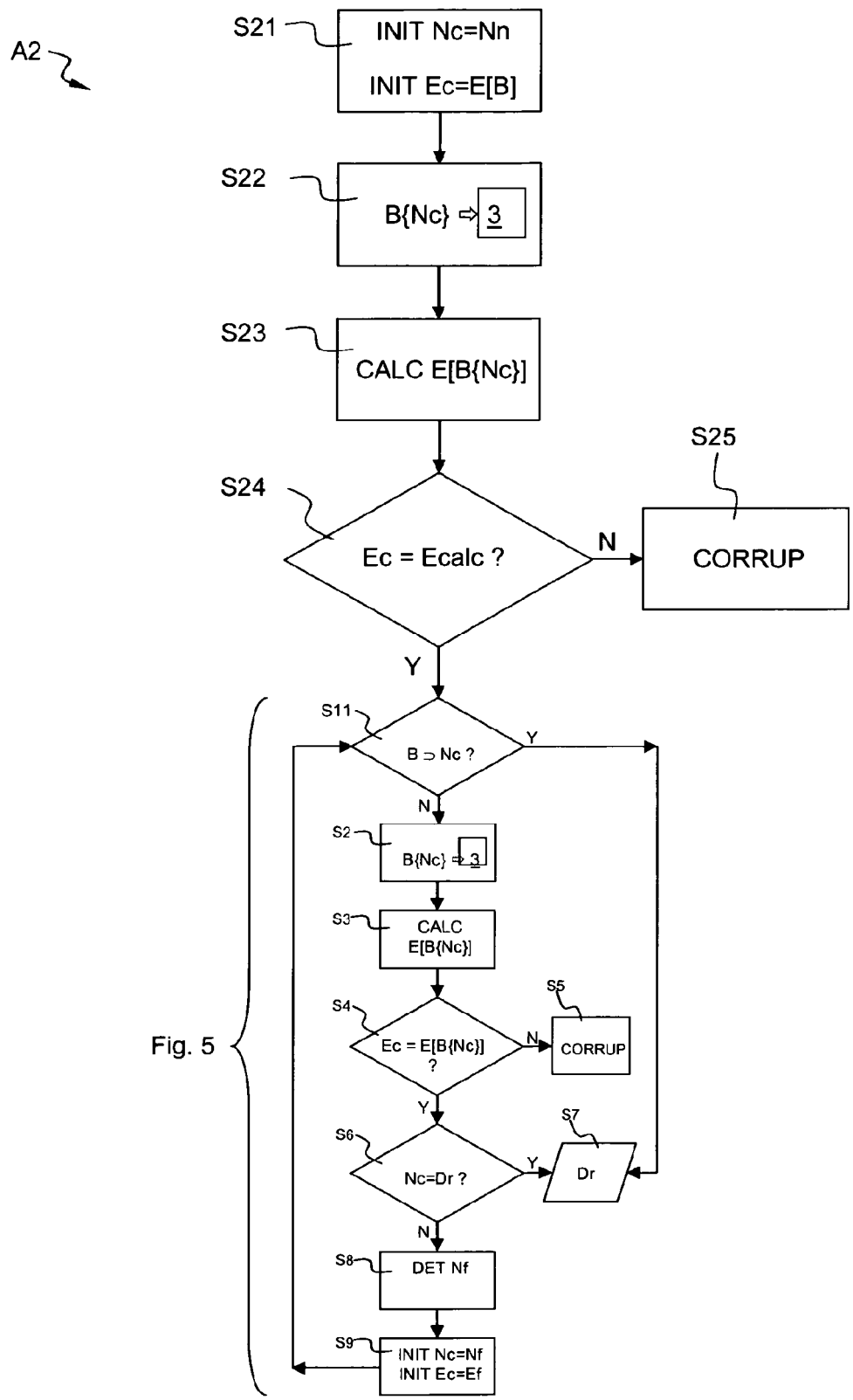
FIG. 6 schematically illustrates a variant of the mode of embodiment of FIG. 5.

Because the size of a digest is smaller than that of a block, it is advantageous to only retain in the trusted cache memory the digest of some blocks and not their content. When one has the cache of the digest of a block B in the trusted memory, it is unnecessary to verify the digest of the blocks containing the ancestor nodes of block B. FIG. 6 schematically illustrates a variant A2 of the mode of embodiment of FIG. 5. This variant differs from the mode of embodiment of FIG. 4 in that the first initialisation step S1 is replaced with several additional steps S21, S22, S23, S24 and S25. The first additional step S21 consists in initialising the current node Nc at a node Nn contained in a block B and the current digest value Ec at the value of the digest E[B] of the block B found in the trusted cache memory 3. The second additional step S22 consists in loading the block B from the mass storage memory to the trusted memory. The third additional step S23 consists in calculating the digest Ecalc of the block B. The fourth additional step S24 consists in verifying the match between the calculated digest value and the current digest value Ec. The fifth additional step S25 consists in reporting an error and stopping the access method when the calculated digest value of block B differs from the current digest value. If the calculated digest value of block B is identical to the current digest value, then the method of the mode of embodiment of FIG. 5 may be continued from the additional verification step S11.

The variant that has just been described is advantageous because the digest cache allows a faster downward path in the verification tree, that is to say with a smaller number of digest calculations as compared with access according to the first mode of embodiment. That is because access to a block by a method according to the first mode of embodiment necessitates a downward path for each intermediate node on the access path to the affected block. The complexity, measured in the number of blocks loaded and digest calculations, is quadratic in relation to the depth of the modified node. When the digest of an intermediate node is already present in the trusted cache memory, a new downward path is avoided for that digest. That is particularly advantageous for access to a node that needs to be updated.

Advantageously, it is possible to provide that when the block or the digest block of the current node is stored in the trusted cache memory, then the block or the block digest of the parent node at the current node are also stored in the trusted cache memory.

When that condition is verified, the updating of a block may take place in linear time, providing the cache is large enough. The method for accessing a piece of data according to the first mode of embodiment described (FIG. 3) necessitates a number of loading operations and digest value calculations proportional with the depth of the node affected in the tree. The update method (FIG. 4) only necessitates loading and calculating the digest value of the blocks that are no longer present in the cache memory. If all the blocks are present in the cache memory, no new loading is required. If all the digest values are still in the cache memory, each block must be loaded no more than once, for updating, as the verification of the digest values of its descendants is not necessary.

The fulfilment of this condition imposes a requirement on the erasing mechanism of the content of the cache memory. That is because the erasing mechanism must provide for the following:
  when a block is erased from the cache memory, it must first calculate its digest value if necessary and keep it in the cache memory, and
  when a digest value of a block is erased from the cache, all the blocks and all the digest values of the sub-trees derived from the nodes contained in that block must also be erased.

Writing Cache Memory

When blocks have been modified, it is possible that modified blocks are not written immediately in the mass storage memory. In that case, they are retained in the trusted cache memory for subsequent writing in the mass storage memory. The mode of embodiment of the invention that will be described below relates to the combination of a cache memory used for writing with the cache memory used for reading described earlier.

When a block that is part of the verification tree structure has been modified, two operations must be carried out to take account of these modifications. First of all, the content of the block must be written in the mass storage memory. Secondly, the digest in the parent node must be updated, which constitutes a modification of the block containing the parent node. Each of these two operations may be deferred. The two operations are not necessarily carried out at the same time.

Advantageously, the time and order of these two deferred operations is determined dynamically, that is on a case-by-case basis during the execution of the different operations by the processor. In a first example, the digest may be updated as soon as the parent node is modified for any reason, while the block is only written when the need for cache memory space makes it necessary to retrieve the portion of the cache memory allocated to the block. In a second example, if a need for cache memory space is felt before the parent node is updated, the block digest is calculated and kept in the cache memory no later than at the time when the cache memory allocated to the block is retrieved.

Audacious Cache Memory

Another mode of embodiment of the invention consists in so-called audacious reading or access to the data stored in the mass storage memory. Audacious access to data consists in reading a node in a way that does not make sure that the data read have not been corrupted. Calculations may be carried out on the data, and also action depending on the data, providing the action is reversible if corruption is detected later on. A subsequent verification is carried out to decide whether to retain the result of the calculation if no corruption is detected or to cancel the action undertaken if corruption is detected. Even if such separation can lead to the performance of unnecessary calculations, the efficiency gain is advantageous as long as disturbances are sufficiently rare, that is to say below a given limit, or if the disturbances are due to deliberate attacks caused by a third party.

One method of audacious access to data consists in implementing the method of access according to the embodiment modes described above without carrying out the calculations and verifications of digest values. These calculations and verifications are replaced by a grouped verification step consisting in grouping accesses with verification. For example, the verification step may be implemented at the end of a complex transaction. That makes it possible to avoid having to verify the same access path to a sub-tree several times when several pieces of data are read in the sub-tree.

Figure 7:
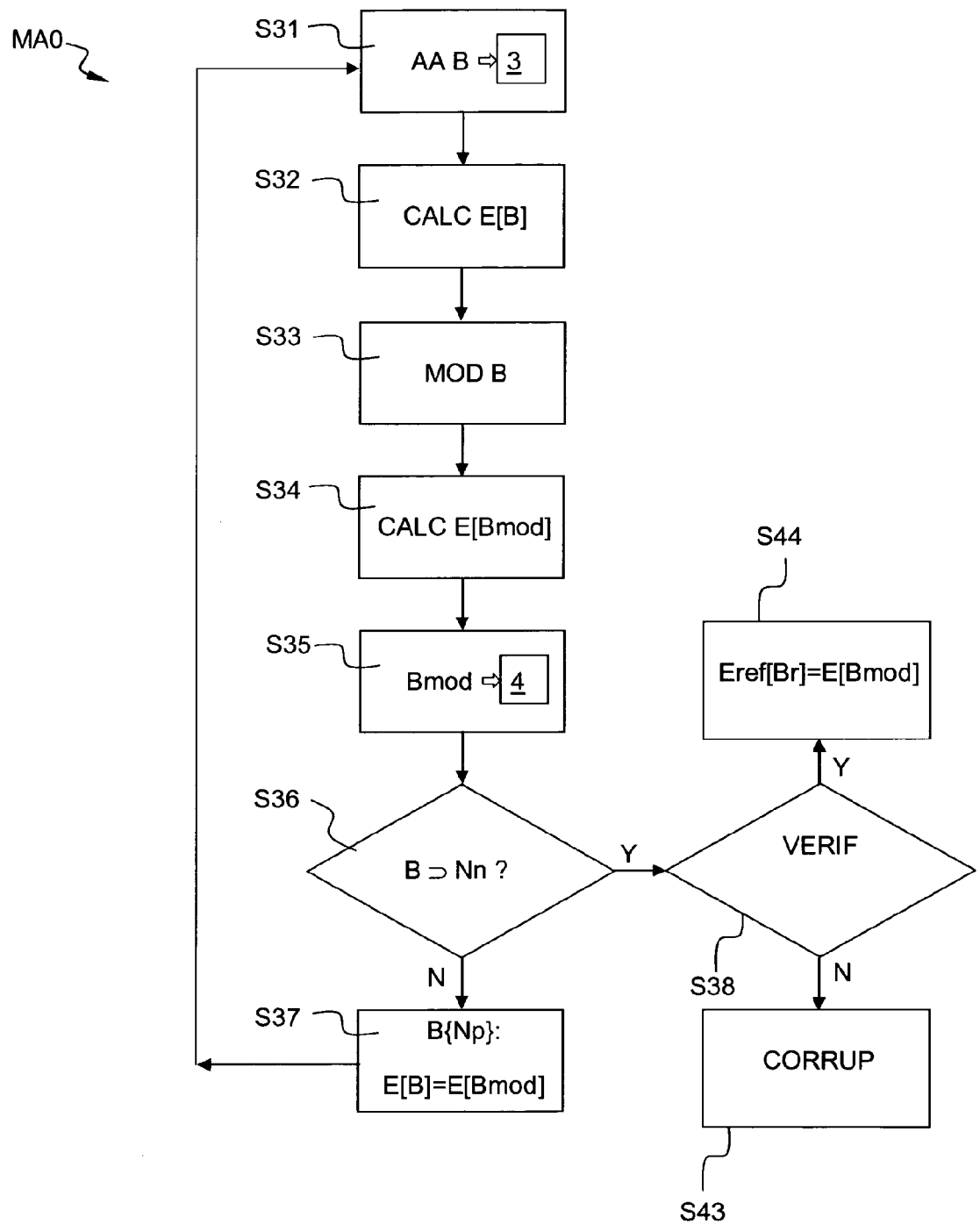
FIG. 7 schematically illustrates the audacious modification of a block in the mass storage memory.

FIG. 7 schematically illustrates the audacious modification MA0 of a block B in a sub-tree derived from a node Nn in the mass storage memory 4. In this mode of embodiment, the audacious modification involves the audacious writing of unverified data in the storage memory, and a subsequent verification against old digests. A first step S31 consists in audaciously accessing the block B located in the mass storage memory and transferring the said block B to the trusted memory 3. A second step S32 consists in calculating the digest E of the block B as it is read. A third step S33 consists in modifying the content of the block B. A fourth step S34 consists in calculating the value of the digest E[Bmod] of the modified content of the block. A fifth step S35 consists in writing the content of the block Bmod in the mass storage memory 4, while also retaining the old content of the block B. A sixth step S36 consists in verifying if the block B contains the node Nn. If the block B contains the node Nn, the audacious modification is completed. Otherwise, the method continues with the seventh step S37, that is the audacious modification consisting in replacing the former digest E[B] of the block containing the said node Nn with the new digest E[Bmod] of the block containing the said node Nn in the parent node of the node Nn.

Audacious modification may write false data on the mass storage medium if one of the audacious accesses has read corrupted data. It is thus advantageously followed by a subsequent verification operation S38 that consists in verifying all the digests of the nodes modified by verified access, for example in the first mode of embodiment. If such verification detects corruption S43, all the blocks modified audaciously in this way are rejected. If such verification S38 does not detect corruption, the new digest of the root node becomes the reference digest Eref[Br]=E[Bmod] S44.

Figure 8:
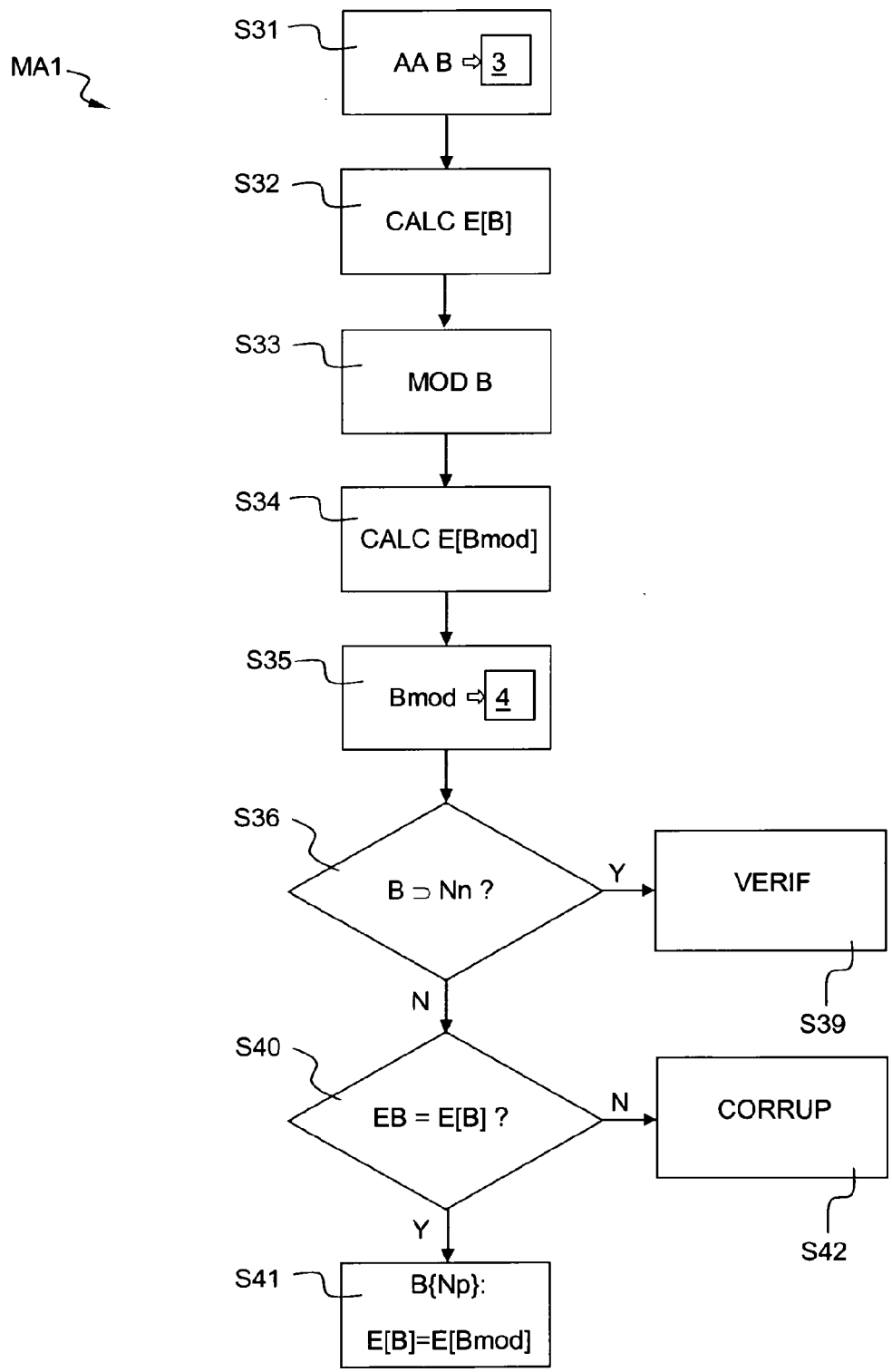
FIG. 8 schematically illustrates the audacious modification using authenticated digests of a block in the mass storage memory.

Advantageously, the audacious modification described in relation with FIG. 7 may be modified to be used with authenticated digests. The authentication of the digest of a node combined with the verification of the consistency of digests within the sub-tree derived from this node is enough to guarantee the authenticity of the data read in the sub-tree. The authentication of the digest of a node guarantees that the node does indeed have a legitimate origin and has not been created by a third party, while verification of the consistency of the digests within the sub-tree guarantees that the third party has not rearranged the existing nodes or combined them with nodes from at least one older version of the tree. FIG. 8 illustrates an audacious modification MA1 with authenticated digests. The audacious modification method in FIG. 8 differs from that of FIG. 7 in that it comprises the following additional steps.

One additional first step S39 consists in carrying out a verified access VERIF to block B and comparing the unmodified content that is read audaciously with the content verified when the block B contains the node Nn. If no corruption is detected, the former content of the modified blocks may be erased.

A second additional step S40 consists in verifying if the former value of the digest for B is identical to the value of digest E. If that is not so, that means that the content of block B read audaciously was corrupted and such corruption is then reported in a step S42.

A third additional step S41 consists in replacing the value of the digest of the parent block with the calculated digest value E[B]=E[Bmod] in a parent block containing the parent node of the block B{Np}, when the former digest value for B is identical to the digest value.

Two-Level Cache Memory Structure

Electronic systems that use the methods described above may comprise two memories—one trusted cache memory of a limited size and a larger memory that is liable to be disrupted. This may for instance be a processor with a trusted cache memory of the type L1 and an unsecured cache memory of the type L2. Such a configuration is particularly seen when the cache memory L1 and the processor share the same chip, while the cache memory of the type L2 is on another chip that may be spied upon or replaced.

In such a configuration, the unsecure cache memory may also be used as a cache memory vis-à-vis the mass storage memory. The operations, calculations and verifications of digests are always carried out in relation with loading in the trusted cache memory, either directly from the mass storage memory or through the unsecured cache memory. The methods for accessing and modifying data that have been described above are applicable to this two-level cache memory structure.

Volatility

In a mode of embodiment of the invention, the mass storage memory may retain data indefinitely, whereas the trusted cache memory is a volatile memory, that is to say where the content is lost if the power supply to the trusted core is cut off.

The methods described above use the reference value of the digest of the root node. Advantageously, to guarantee the authentication of data after a loss of the content of the volatile memory, the trusted processor has a secret key kept in the non-volatile trusted memory, for example a read-only memory or a PROM (Programmable Read-Only Memory) or an EEPROM (Electrically Erasable Programmable Read-Only Memory). That memory must further guarantee the confidentiality of the secret key, that is to say that the said key can only be read by the trusted core. Every time data are written to the root block, the processor also writes a cryptographic signature of the value of the digest of the root block or of the root block in the mass storage memory. While initialising the processor after a loss of the content of the volatile trusted cache memory, the processor reads the said cryptographic signature and verifies its integrity, reporting an error if it is incorrect.

Thanks to the cryptographic signature present in the non-volatile rewritable trusted memory, the processor is capable of accepting only the value of the digest of the root node produced by itself, and detecting and signalling corruption, particularly an attempted attack by replaying a past version of the content of the mass storage memory. In that way, the verification tree structure guarantees the consistency of stored data, while the cryptographic signature of the digest value of the root node guarantees that the data are indeed those that have been written earlier by the same trusted processor.

However, the data that have been written earlier by the same trusted processor may not be the latest version written in the mass storage memory. In such a situation, all the past versions have a correct signature.

Advantageously, the older versions of the data stored are erased while writing a new version. However, that is not sufficient if the mass storage memory is directly under the control of an attacker who may save a version to restore it later.

The replaying of an older version can be avoided if the trusted processor has a persistent trusted memory, which can withstand the switching off of power or has an independent backing up power supply. That persistent trusted memory may be used in several ways to restrict the values of the digest or the signature of the root block accepted during the initialisation of the trusted processor.

One first variant consist in storing in the persistent trusted memory the digest or the signature of the root block with each new writing of data in the said root block. During initialisation, the digest or the signature of the root block is read back from the mass storage memory. If that value is identical to that stored in the persistent trusted memory, the execution of the initialisation continues. Otherwise, a mass storage memory corruption error is reported.

A second variant consists in storing several versions judged as acceptable of the digest or the signature of the root block. Advantageously, the new value of the said digest or signature is stored in the persistent memory before writing the new root block in the mass storage memory, then the former value of the digest or signature is erased once the writing of the new root block in the mass storage memory has been confirmed. In that way, if there is a power failure during the writing process, both the old and new versions are considered to be valid.

A third variant concerns the electronic systems with a trusted core that do not have a persistent arbitrary memory, but only an increasing counter. An increasing counter is a memory in which the only possible modification is the addition of a unit to the stored value. In this case, the value of the counter is used as the version number. That version number or a piece of data deduced from the said version number is copied to the root block before each time it is written to the mass storage memory. Also, between two successive writing operations of a new version of the root block in the mass storage memory, the memory counter is modified by incrementing one unit. In that way, each root block writing operation has a different version number. While initialising the trusted core, only one root block containing the last value written or the last but one value written if there is a power cut during the last writing operation is accepted. It is also possible to only modify the version number when modifications of the root block that are judged to be critical are made. For instance, only modifications that have led to the modification of critical data may be taken into account.

The invention claimed is:

1. A method for verification of data of an electronic system comprising a trusted processor, a trusted cache memory and a mass storage memory, where the data are stored in the mass storage memory, the memories are divided into blocks, each block is identified by an address, the data are addressed via a verification tree, the verification tree is a tree structure comprising nodes where descendent nodes are attached to a root node and each node stores the address of the block containing each descendent node of the node and a digest value of each block storing such descendent node, the method, which maintains a current digest value, comprises access to searched data by:
a) initialising a current node at the root node by initialising the current digest value as the value of a reference digest of the block containing the root node,
b) loading the block containing the current node in the trusted cache memory,
c) calculating a digest value of the loaded block,
d) reporting corruption of data if the calculated digest is different from the current digest value and stopping access to the data searched,
e) sending back the current node if the current node contains the searched data and stopping the step for access to the searched data,
f) determining the child node from which a sub-tree containing the data is derived,
g) assigning the value of the digest of the child node stored in the current node as the current digest, the child node becoming the current node,
h) looping to the loading step b).

2. The method for the verification of data of an electronic system according to claim 1, where after the initialisation step of the current node a), the method involves an additional step consisting in verifying if a block located in the trusted memory contains the current node, the loading steps b), the digest calculation step c), the digest verification and data corruption step d) being implemented when the said block does not contain the current node.

3. The method for the verification of data of an electronic system according to claim 1 or 2, where the initialisation step consists in initialising the current node to a node N by initialising the current digest value as the value of a digest calculated from a block present in the trusted cache memory and containing an ancestor node N of the node containing the searched data.

4. The method for the verification of data of an electronic system according to claim 1 or 2, where the initialisation step consists in initialising the current node to a node N by initialising the current digest value as the value of a digest found in the trusted cache memory when the value of the block is present in the trusted cache memory.

5. The method for the verification of data of an electronic system according to claim 1 or 2, where when the block or block digest of the current node are stored in the trusted cache memory, the block or the block digest of the parent node at the current node are also stored in the trusted cache memory.

6. The method for the verification of data of an electronic system according to claim 1 or 2, where the method includes the modification of a block by:
a) accessing the block located in the mass storage memory and transferring it to the trusted memory, b) modifying the content of the block,
c) calculating the value of the digest of the modified content of the block,
d) writing the content of the modified block in the mass storage memory,
e) if the block contains the root node, storing the calculated digest value in the trusted memory as the new value of the reference digest of the block,
f) if the block does not contain the root node, in a parent block containing the parent node of the block, replacing the digest value of the parent block with the calculated digest value.

7. A method for verification of data of an electronic system comprising a trusted processor, a trusted cache memory and a mass storage memory, where the data are stored in the mass storage memory, the memories are divided into blocks, each block is identified by an address, the data are addressed via a verification tree, the verification tree is a tree structure comprising nodes where descendent nodes are attached to a root node and each node stores the address of the block containing each of descendent node and a digest value of each block, the method, which maintains a current digest value, comprises a modification of a block by:
    a) reading the content of the block to be modified and located in the mass storage memory and transferring the block to be modified to the trusted memory without verifying integrity of the block,
    b) calculating a digest value of the content of the block read,
    c) modifying the content of the block,
    d) calculating a digest value of the modified content of the block,
    e) writing the content of the modified block in the mass storage memory without overwriting the previous content of the block,
    f.) if the block does not contain the root node, in a parent block containing the parent node of the block, replacing the digest value of the parent block with the calculated digest value.

8. The method for the verification of data of an electronic system according to claim 1 or 7, where the digest is a check sum for protection from accidental corruption or a cryptographic digest that is authenticated or otherwise for protection from tampering.

9. The method for the verification of data of an electronic system according to claim 1 or 7, comprising a step of decryption of the data transferred from the mass storage memory to the trusted cache memory and a step of encryption of the data transferred from the trusted cache memory to the mass storage memory.

10. The method for the verification of data of an electronic system according to claim 1 or 7, where the mass storage memory is a cache memory vis-a-vis another mass storage memory.

11. The method for the verification of data of an electronic system according to claim 1 or 7, comprising a step of clearing the trusted cache memory consisting in dynamically determining the time and the order of writing the content of the modified block in the mass storage memory and updating the digest in the parent node before they are erased from the trusted cache memory.

12. A non-transitory storage medium storing a computer program comprising program code instructions that make a programmable processor execute steps of the data verification method when the said program is executed by the programmable processor, wherein the program comprises instructions to cause the programmable processor to execute a method, which maintains a current digest value, comprising access searched data by:
    a) initialising a current node at the root node by initialising the current digest value as the value of a reference digest of the block containing the root node,
    b) loading the block containing the current node in the trusted cache memory,
    c) calculating a digest of the loaded block,
    d) reporting corruption of data if the calculated digest is different from the current digest value and stopping access to the data searched,
    e) sending back the current node if the current node contains the searched data and stopping the step for access to the searched data,
    f) determining the child node from which a sub-tree containing the data is derived,
    g) assigning the value of the digest of the child node stored in the current node as the current digest, the child node becoming the current node
    h) looping to the loading step b).

13. An electronic system comprising a trusted processor, a trusted cache memory and a mass storage memory, where the trusted processor and the trusted cache memory are located in a trusted core, the mass storage memory is located in an unsecure environment, and where the processor has been programmed through instructions stored in non-transitory memory to cause the trusted processor to execute instructions of a method, which maintains a current digest value, to access searched data by:
    a) initializing a current node at the root node by initialising the current digest value at the value of a reference digest of the block containing the root node,
    b) loading the block containing the current node in the trusted cache memory,
    c) calculating the digest of the loaded block,
    d) reporting the corruption of data if the calculated digest is different from the current digest value and stopping access to the data searched,
    e) sending back the current node if the current node contains the searched data and stopping the step for access to the searched data,
    f) determining the child node from which a sub-tree containing the data is derived, assigning the value of the digest of the child node stored in the current node at the current digest, the child node becoming the current node looping to the loading step.

* * * * *